United States Patent [19]
Hoffman

[11] Patent Number: 4,604,737
[45] Date of Patent: Aug. 5, 1986

[54] ELECTRONIC DIVING APPARATUS

[75] Inventor: Gordon B. Hoffman, Colorado Springs, Colo.

[73] Assignee: Hoffman & Goode, Richardson, Tex.

[21] Appl. No.: 514,317

[22] Filed: Jul. 15, 1983

[51] Int. Cl.[4] ...................... G06F 15/42; H04B 11/00
[52] U.S. Cl. ..................................... 367/134; 364/418
[58] Field of Search ................. 367/134, 131; 364/418

[56] References Cited

U.S. PATENT DOCUMENTS

| | | | |
|---|---|---|---|
| 3,133,261 | 5/1964 | Ott ........................................ | 367/134 |
| 3,512,125 | 5/1970 | Raymond ............................ | 367/134 |
| 3,992,948 | 11/1976 | D'Antonio et al. ................. | 364/418 |
| 4,005,282 | 1/1977 | Jennings ............................... | 364/418 |
| 4,054,783 | 10/1977 | Seireg et al. ......................... | 364/418 |
| 4,056,010 | 11/1977 | Alinari ................................. | 73/432 |
| 4,307,449 | 12/1981 | Strubin ................................ | 364/418 |
| 4,336,591 | 6/1982 | Berdzar et al. ...................... | 364/418 |
| 4,428,073 | 1/1984 | Verburgt ............................. | 367/134 |

OTHER PUBLICATIONS

Paramonov, Deep Sea Research, vol. 10, No. ½, Jan.-Apr. 1963, pp. 77-81.

*Primary Examiner*—Richard A. Farley
*Attorney, Agent, or Firm*—Richards, Harris, Medlock & Andrews

[57] ABSTRACT

An electronic diving apparatus detects pressure by means of a bellows transducer (12). A variable frequency oscillator (10) produces a variable frequency output in proportion to the pressure applied to the transducer (12). A local oscillator (16) produces a fixed frequency signal which is mixed with the variable frequency signal in a mixer-demodulator (14) to produce an audio depth signal. The audio depth signal is provided to up/down counters (30). A time base and synchronizer circuit (24) sequences the counters (30) for an up frequency count and a down frequency count of the audio depth signal. When the difference count exceeds a preset limit, a maximum rate of depth change circuit (34) produces an alarm signal which is transmitted through a beep timer circuit (36) to activate an audio driver and output circuit (28) which produces alarm signal at an audio disk (38). This gives a warning of too rapid of an ascent or descent by the diver. The maximum depth circuit (32) detects the maximum up-count produced by the counters (30) and if the count is above a preset limit, an alarm is output through the audio driver and output circuit (28) to the audio disk (38) to warn the diver of an excessive depth. The electronic diving apparatus produces a periodic tone which has a frequency proportional to depth. Warning signals are indicated by modulating the tone or by increasing the duty cycle. Further aspects of the invention include a preset depth indicator, digital tone indications of depth and synthesized speech output to provide voice messages for each of the above alarms and indications.

14 Claims, 10 Drawing Figures

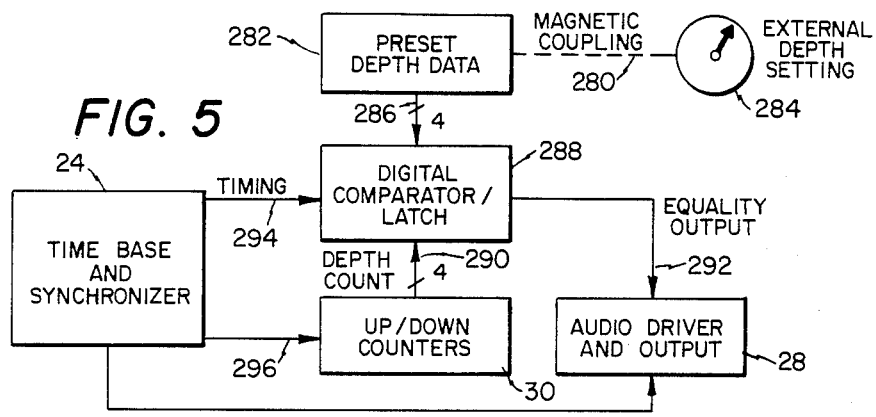
FIG. 5
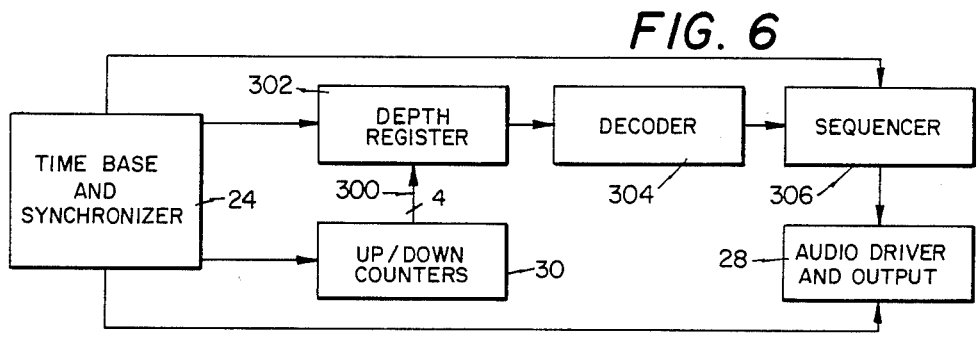
FIG. 6
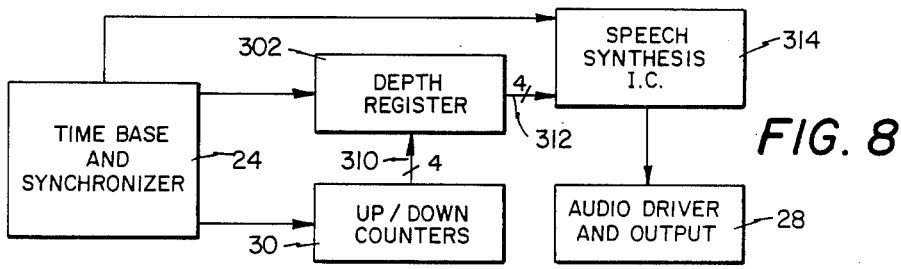
FIG. 8
| DEPTH | SEQUENCE |
|---|---|
| 10 | + |
| 20 | ++ |
| 30 | +++ |
| 40 | ++++ |
| 50 | − |
| 60 | −+ |
| 70 | −++ |
| 80 | −+++ |
| 90 | −++++ |
| 100 | −− |
| 110 | −−+ |
| 120 | −−++ |
| 130 | −−+++ |
| 140 | −−++++ |
| 150 | WARNING |
TWO TONES (+) AND (−)
FIG. 7

ELECTRONIC DIVING APPARATUS

TECHNICAL FIELD

The present invention pertains in general to depth indicating devices and, more particularly, to electronic diving devices that produce sounds to indicate specific conditions to the user.

BACKGROUND OF THE INVENTION

In scuba diving, it is very important to avoid conditions such as the "bends", also variously known as "Cassion's Disease", "compressed air illness" and "diver's palsy", a condition that occurs in individuals who, having been exposed to increased environmental pressure, are subjected to too abrupt a reduction in the pressure. To prevent such a condition, it is necessary for a diver to undergo gradual compression and decompression. The cause of this disorder is the rapid liberation of nitrogen from the fluids and tissues of the body as a result of the diver going too rapidly from high to low pressure. The presence of this nitrogen is due to the increase in solubility of the gas under higher pressure, as encountered in a cassion. As pressure is reduced, liberated gas forms bubbles in nerve tissue, muscles, brain and other body tissue. The only treatment for the bends is recompression and slow decompression. If a diver has risen too rapidly, he is placed as quickly as possible into an airlock and the air pressure is increased until the air bubbles in his body go into solution. The pressure is then very gradually lowered until normal air pressure is realized. In view of the severity of this condition, it is desirable to prevent its occurrence under normal diving conditions. For example, the U.S. Navy has derived a set of decompression tables that specify rates such as 60 feet per minute as an upper limit on the speed with which either an ascent or descent is undertaken.

Once in the water, a diver can become confused as to whether he is descending or ascending, especially in the dark or in murky water. This can cause problems since the diver can make a change in depth that is too rapid or he can dive to a dangerous depth. To aid the diver, apparatus has been developed to indicate to the diver both his depth and his rates of ascent or descent. In addition, some of these devices have included rate warning devices. For example, U.S. Pat. No. 3,992,948 discloses a system that outputs a visual or audible warning whenever a predetermined rate of ascent or descent is exceeded. In addition, the system indicates with a visual or audible signal the fact that the diver is ascending or alternatively descending.

In certain situations, such as cave diving, it is important that the diver have a continual indication of his depth and whether he is ascending or descending. The use of visual indicators can be distracting since a diver often concentrates intently on the task at hand. Visual indicators are therefore undesirable in this regard. In view of these problems, there exists a need for an indicating device that supplies continual information to the diver regarding the status of his dive and further, provides requisite warning signals for too rapid of an ascent or descent and too deep of a dive.

SUMMARY OF THE INVENTION

A selected embodiment of the present invention comprises an electronic diving apparatus for producing indication sounds while a diver is in a body of water. The apparatus includes a sensor for determining ambient pressure in the body of water. Circuitry is provided which is responsive to the ambient pressure for generating an audio depth signal having a frequency that is related to the ambient pressure. A transducer is provided for receiving the audio depth signal and producing a corresponding sound in the body of water. The resulting sound has a pitch which is proportional to the depth of the apparatus in the body of water.

In a further aspect of the present invention there is provided a means for setting a predetermined depth parameter within the apparatus for generating an indication signal when the apparatus has reached the depth corresponding to the predetermined depth.

In a further aspect of the present invention there is included circuitry for producing a sequency of audio tone pulses which are coded to represent the depth of the apparatus within the body of water.

In a still further aspect of the present invention there is provided circuitry for generating an alarm signal when a maximum rate of ascent is exceeded.

BRIEF DESCRIPTION OF THE DRAWINGS

For a more complete understanding of the present invention and the advantages thereof, reference is now made to the following description taken in conjunction with the accompanying drawings in which:

FIG. 5 is a functional block diagram of an embodiment of the present invention which produces a warning sound when a preselected depth is reached;

FIG. 6 is a functional block diagram of an embodiment of the present invention which produces encoded tone sequences to indicate depth;

FIG. 7 is a chart showing tone sequences which correspond to depths for the apparatus shown in FIG. 6;

FIG. 8 is a functional block diagram of an embodiment of the present invention which uses a speech synthesizer.

DETAILED DESCRIPTION OF THE INVENTION

Figure 1:
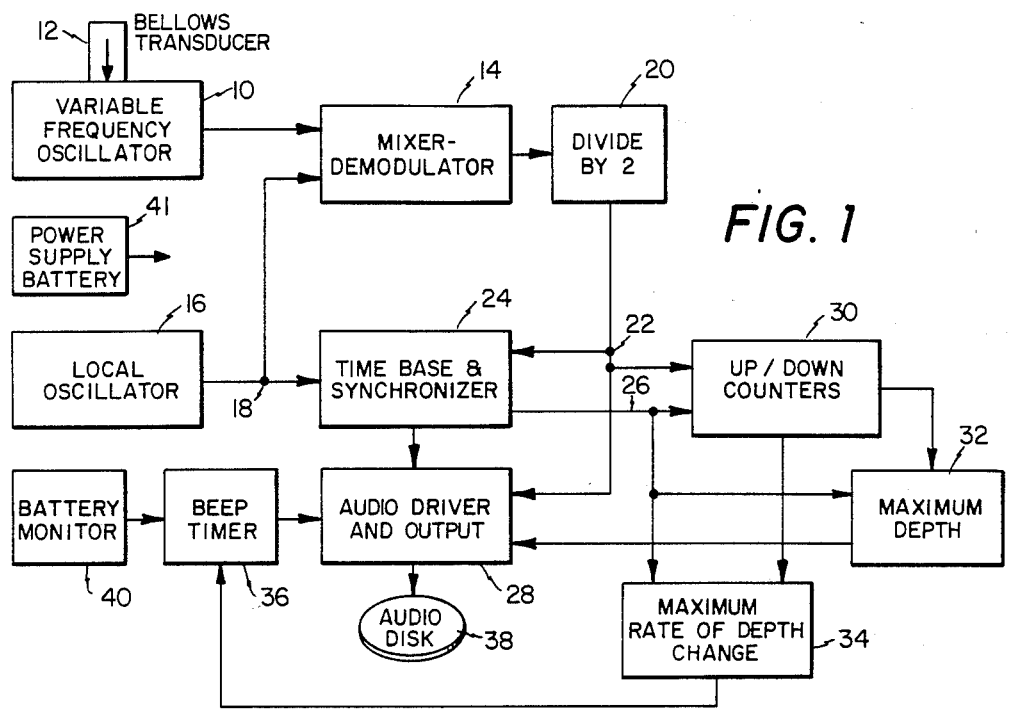
FIG. 1 is a functional block diagram of the electronic diving apparatus of the present invention.

Referring to FIG. 1, there is shown a functional block diagram for a selected embodiment of the electronic diving apparatus of the present invention. A variable frequency oscillator 10 provides an output signal having a frequency that is varied by pressure changes on a bellows transducer 12. The transducer 12 is operable, as is further described hereinbelow, to mechanically transform a pressure change into a control signal that alters the frequency of the signal produced by the variable frequency oscillator 10. The output of the oscillator 10 is provided to a first input of a mixer-demodulator 14.

A local oscillator 16 produces a signal at a frequency of 32.768 KHz. This signal is provided to a node 18. The node 18 is connected to the second input of the mixer-demodulator 14. The mixer-demodulator 14 mixes the signal from the variable frequency oscillator 10 and the signal from the local oscillator 16 to provide a beat frequency output signal at a frequency that is the difference between the frequencies of the two input signals. The frequency of the signal produced by the variable frequency oscillator (hereinafter VFO) 10 is adjustable between 33.0 and 40.0 KHz. When the VFO 10 signal is mixed with the output of the local oscillator (hereinafter LO) 16, the output of the mixer-demodulator 14 is in the audio range, that is, between approximately 1,000 Hz to 10,000 Hz. The signal produced by the mixer-demodulator 14 is referred to herein as an audio signal or audio depth signal. The frequency of this signal is related to the ambient water pressure.

The audio depth signal from the mixer-demodulator 14 is transmitted through a divide-by-2 circuit 20. The output from the divide-by-2 circuit 20 is connected to a node 22. The frequency of the audio depth signal output from the divide-by-2 circuit 20 is in the frequency range of 500 Hz to 5,000 Hz, which is one-half the frequency of the signal produced by the mixer-demodulator 14.

A time base and synchronizer circuit 24 has a first input connected to node 22 and a second input connected to node 18. The time base and synchronizer circuit 24 has two outputs, one output is connected to a node 26 and the other output provides an input to an audio driver and output circuit 28.

An up/down counter circuit 30 receives one input from node 26 and the other input from node 22. The audio depth signal produced by the divide-by-2 circuit 20 is a series of pulses which are counted by the up/down counter circuit 30. The output from the time base and synchronizer circuit 24 is utilized to control the up and down modes for the up/down counters which are in the up/down counter circuit 30, as described below.

The up/down counter circuit 30 has two outputs, one output is connected to the input of a maximum depth circuit 32 and the other output is connected to a maximum rate of depth change circuit 34. The maximum depth circuit 32 receives a second input from node 26 and the maximum rate of depth change circuit 34 also receives a second input from node 26. The output from the maximum depth circuit 32 is provided to the audio driver and output circuit 28. The output of the maximum rate of depth change circuit 34 is provided to a beep timer circuit 36. The output from the beep timer circuit 36 is provided to the audio driver and output circuit 28. The output of the circuit 28 is transmitted to an audio disk 38 which produces audible sounds as controlled by the various inputs thereto. The disk 38 is a transducer which produces sounds in the body of water containing the diving apparatus.

A battery monitor circuit 40 determines the charge level of a power supply battery 41. The output from circuit 40 is provided to the beep timer circuit 36. The power supply battery 41 delivers power for all of the circuits shown in the functional block diagram of FIG. 1. The battery monitor circuit 40 serves to monitor the voltage of the power supply battery 41 and provide a warning signal to the beep timer circuit 36 if the battery voltage is lower than required. Circuit 36 in turn causes circuit 28 to generate a low battery signal to drive disk 38.

The audio depth signal output by the divide-by-2 circuit 20 is a function of the external pressure applied to the diving apparatus such that an increase in pressure causes an increase in frequency, thus indicating greater depth. The rate of frequency change is internally set to approximately 30 Hz of frequency change for each foot of depth. The up/down counter circuit 30 receives a control signal from the time base and synchronizer circuit 24 to cause circuit 30 to count the pulses in the audio depth signal in an up-count for approximately one-half second and in a down-count for approximately one-half second. If there is no change in the audio depth signal frequency, the number of pulses counted in the up-count is exactly equal to the number of pulses counted in the down-count. By examining the contents of the up/down counter circuit 30 after the down-count is terminated, an indication of the change in frequency is available. In addition, if during the up-count, a preset maximum number of pulses is received, an output signal is transmitted to the maximum depth circuit 32. For example, if the depth increases past 150 feet, which corresponds to an audio frequency of approximately 5,000 Hz, an excess number of pulses will be entered into the up/down counter circuit 30 during the up-count. This excess number of pulses is recognized and a signal is output to the maximum depth circuit 32. The output from the maximum depth circuit 32 is then provided to the audio driver and output circuit 28 to provide a distinguishing audible signal from the audio disk 38 such that a diver can recognize that he has exceeded the preset depth of 150 feet.

When the diver is at less than the maximum depth, a change in depth during the one-half second up-count and the one-half second down-count results in a difference count at the completion of the up and down counts. For an ascent or descent rate of 1 foot/second, there is a change in frequency of approximately 30 Hz/second. For a one-half second up-count and a one-half second down-count, there is a frequency change of approximately 7.5 Hz. The up/down counter circuit 30 recognizes at the end of the up/down counts that the number of total pulses at the end of the counts is not zero. Internal to the up/down counter circuit 30 is a preset level that, if exceeded, triggers the maximum rate of depth change circuit 34, as described above. This maximum level is set such that when the ascent or descent exceeds 60 feet per minute, the maximum depth change circuit 34 is activated. This maximum rate is recommended by the U.S. Navy Standard Decompression Tables. The output of the maximum rate of depth change circuit 34 alters the output of the beep timer circuit 36 such that the output of the circuit 28 differs to produce a distinguishable change in the audio signal delivered to the diver.

In a further aspect of the present invention, the audio depth signal from the divide-by-2 circuit 20 is modulated to produce periodic pulses by the beep timer circuit 36. These pulses are provided continuously, in normal operation, to the audio disk 38. The sounds produced by these pulses provides the diver with a constant reminder of his depth status. For example, when the diver is at a given depth, the audio disk 38 outputs a constant frequency sound. If the diver increases his depth, this is indicated by an increase in frequency from the audio disk 38. In a like manner, when the diver decreases his depth, or ascends, the frequency decreases for the sound produced by the audio disk 38. After experiencing the frequency changing sounds produced by the electronic diving apparatus shown in FIG. 1, a diver can learn to approximate his depth in water. The beep timer circuit 36 modulates the output of the audio disk 38 such that the tone occurs approximately one second out of every ten seconds. In addition to minimizing power drain from the power supply battery 41, this modulation also decreases distraction to the diver. The maximum rate of the depth change circuit 34 indicates to the diver that the ascent rate has been exceeded by increasing the duty cycle from the beep timer circuit 36. The maximum depth circuit 32 indicates to the diver that he has surpassed a maximum depth by modulating the audio signal during the on time or by increasing the duty cycle of the sound during the ten second period.

Figure 2:
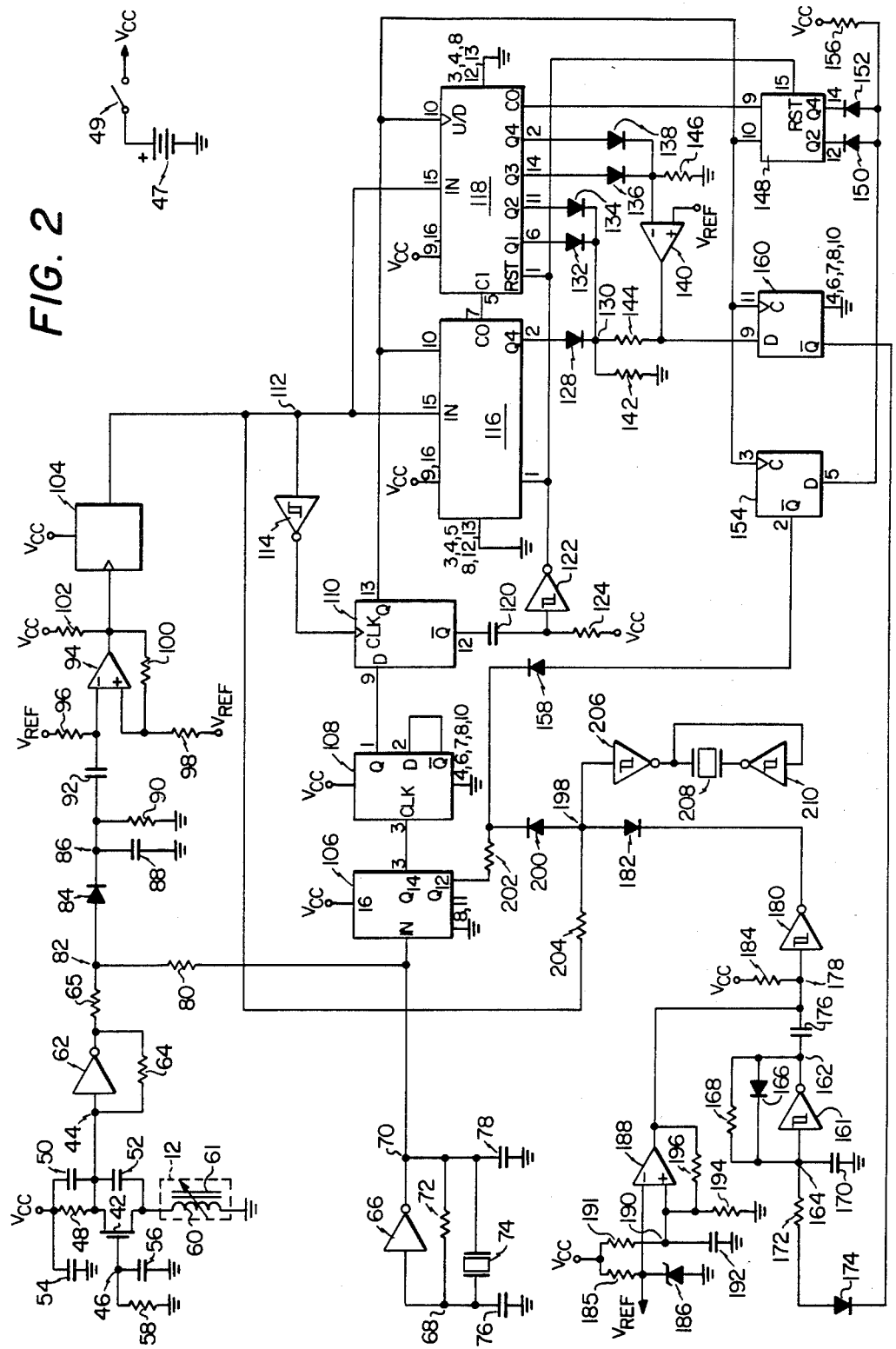
FIG. 2 is a schematic diagram corresponding to the block diagram shown in FIG. 1.

Referring to FIG. 2, there is shown a schematic diagram of the present invention. The bellows 12 is mechanically connected to an inductor core 61, which in turn varies the value of an inductor 60. Inductor 60 is connected to the drain of an FET 42. The source of FET 42 is connected to a node 44. The gate terminal of FET 42 is connected to a node 46. The other end of the mechanical bellows is connected to a circuit ground which is illustrated as a ground symbol, hereinafter referred to as ground. It should be understood that all connections to ground are common although each is represented by a single ground symbol. A resistor 48 is connected between node 44 to a positive voltage supply terminal represented by the symbol $V_{CC}$. Hereinafter, the positive voltage supply terminal will be referred to as "$V_{CC}$". The power source for the $V_{CC}$ terminals for the circuit of FIG. 2 is derived from a battery 47 which has its negative terminal connected to ground and its positive terminal connected to a first terminal of an on/off switch 49. The second terminal of the switch 49 is connected to the common $V_{CC}$ terminal.

A capacitor 50 is connected between node 44 and $V_{CC}$. A capacitor 52 is connected between node 44 and the drain of FET 42. A capacitor 54 is connected between $V_{CC}$ and ground. The capacitor 54 is an electrolytic capacitor with the positive terminal connected to provide filtering for the $V_{CC}$ supply. A capacitor 56 is connected between node 46 and ground. A resistor 58 is also connected between node 46 and ground. The FET 42 and its associated components are configured as a Colpitts oscillator and comprise the VFO 10 of FIG. 1. The mechanical bellows 12 is connected to inductor 60 which has the inductance thereof altered as a function of external pressure. A change in inductance causes a change in the frequency of the Colpitts oscillator comprising VFO 10. The inductance is changed by adjusting the position of core 61 as a function of pressure, as further described below.

An inverter 62 has its input connected to node 44 and its output connected to one end of a resistor 64. Resistor 64 is connected between the input and output of inverter 62. A resistor 65 is connected between the output of inverter 62 and a node 82. The inverter 62 serves to buffer the output of the FET 42.

An inverter 66 has the input thereof connected to a node 68 and the output connected to a node 70. A resistor 72 is connected between nodes 68 and 70. A crystal 74 is connected between nodes 68 and 70. A capacitor 76 is connected between node 68 and ground. A capacitor 78 is connected between node 70 and ground. The inverter 66, resistor 72, crystal 74 and the capacitors 76 and 78 form the local oscillator 16 shown in FIG. 1. The crystal 74 serves to resonate the inverter 66 at a frequency of 32.768 KHz.

A resistor 80 is connected between the node 70 and node 82. The resistors 65 and 80 serve to sum the outputs of the FET 42 and the inverter 66 at node 82.

A diode 84 has the anode thereof connected to node 82 and the cathode thereof connected to a node 86. A capacitor 88 is connected between node 86 and ground. A resistor 90 is connected between node 86 and ground. The diode 84, capacitor 88 and the resistor 90 demodulate the signal at node 82.

A capacitor 92 is connected between node 86 and the negative input of a comparator 94. Comparator 94 shapes the signal at node 86. The capacitor 92 provides AC coupling. A resistor 96 is connected between the negative input of comparator 94 and a reference voltage terminal noted as $V_{REF}$. A resistor 98 is connected between the positive input of comparator 94 and $V_{REF}$. A resistor 100 is connected between the positive input and the output of comparator 94. A resistor 102 is connected between the output of comparator 94 to $V_{CC}$. Resistor 102 functions as a pull-up resistor. The comparator 94 produces a logic signal which alternates between ground and $V_{CC}$ in synchronism with the rate at which the signal on the node 86 exceeds $V_{REF}$. The resistor 100 provides hysteresis for the comparator 94 such that a degree of noise immunity is provided. The output of the comparator 94 is the difference between the output of the FET 42 and the output of the inverter 66. This output, the audio depth signal, is in the frequency range of approximately 1,000 Hz to 10,000 Hz, as described above.

The output of the comparator 94 is provided to the clock input of a divide-by-2 circuit 104. The divide-by-2 circuit 104 is an up counter and the output of the up count is selected from the least significant bit. The output of the divide-by-2 circuit 104 divides the audio depth signal produced by the comparator 94 by a factor of two to yield a signal frequency range of from 500 Hz to 5,000 Hz.

A 14-stage binary counter/divider 106 has the input thereof connected to the node 70 which is the output of the 32.768 KHz oscillator. The counter/divider 106 has the power supply input on pin 16 connected to $V_{CC}$ and pins 8 and 11 thereof connected to ground. The $Q_{14}$ output on pin 3 is connected to the clock input on pin 3 of a D-type flip-flop 108. The flip-flop 108 has the power supply pin 14 thereof connected to $V_{CC}$, pins 4, 6, 7, 8 and 10 connected to ground and pins 2 and 5 thereof connected together. The flip-flop 108 serves as a divide-by-2 circuit having the Q output at pin 1. The output from the $Q_{14}$ output of the divider 106 provides a 2 Hz signal that is divided down to 1 Hz at the output of the flip-flop 108 at pin 1.

A D-type flip-flop 110 has the D input at pin 9 connected to the Q output of flip-flop 108. The audio depth signal from the divide-by-2 circuit 104 is provided to a node 112. A Schmidt trigger hex inverter 114 has its input connected to node 112 and its output connected to the clock input at pin 11 of the flip-flop 110. The flip-flop 110 serves to synchronize the leading edge of the first occurring audio pulse produced by the inverter 114 with the 1 Hz clock signal produced by the flip-flop 108. Once an audio pulse clocks the flip-flop 110, the input on the data input thereof is latched to the output. The result is that the signal integrity is maintained for the first occurring pulse. The counter/divider 106 and flip-flop 108 comprise the time base and synchronizer circuit 24 shown in FIG. 1.

Two up/down counters 116 and 118 are utilized to detect a rate of change in the frequency of the audio depth signal. The up/down counters 116 and 118 both have pins 9 and 16 thereof connected to $V_{CC}$ and pins 3, 4, 8, 12 and 13 connected to ground with pin 5 of the counter 116 also connected to ground. In addition, both up/down counters 116 and 118 have the clock inputs at pins 15 thereof connected to node 112 to receive the audio depth signal. The up/down mode control at pins 10 are connected to the Q output at pin 13 of the flip-flop 110 which produces the 1 Hz synchronized timing signal. The $\overline{Q}$ output at pin 12 of flip-flop 110 is connected to a first terminal of a capacitor 120. The second terminal of capacitor 120 is connected to the input of a Schmidt trigger hex inverter 122. A resistor 124 is connected between the input of inverter 122 and $V_{CC}$. The capacitor 120, resistor 124 and inverter 122 produce a reset pulse at the output of the inverter 122. This reset pulse is synchronized such that it is coincident with the leading edge of the 1 Hz synchronized timing signal produced at the $\overline{Q}$ output of the flip-flip 110. The output of the inverter 122 is connected to the reset inputs at pins 1 of the up/down counters 116 and 118 to provide a count reset.

The up/down counter 116 has its $Q_4$ output at pin 2 connected to the anode of a diode 128. The cathode of diode 128 is connected to a node 130. The carry-out on pin 7 of counter 116 is connected to the carry-in input at pin 5 of the counter 118. The up/down counter 118 has the $Q_1$ output on pin 6 connected to the anode of a diode 132, the $Q_2$ output at pin 11 is connected to the anode of a diode 134, the $Q_3$ output at pin 14 is connected to the anode of a diode 136 and the $Q_4$ output on pin 2 is connected to the anode of a diode 138. The diodes 132 and 134 have the cathodes thereof connected to the node 130 and the diodes 136 and 138 have the cathodes thereof connected to the negative input of a comparator 140.

A resistor 142 is connected between node 130 and ground. A resistor 144 is connected between node 130 and the output of the comparator 140. A resistor 146 is connected between the negative input of comparator 140 and ground. The positive input of the comparator 140 is connected to $V_{REF}$.

The $Q_4$ output of the counter 116 divides the input signal by a factor of 16. Since the carry-in terminal at pin 5 of the counter 118 is connected to the carry-out terminal on pin 7 of the counter 116, the $Q_1$ output of the counter 118 divides the input signal by a factor of 32, the $Q_2$ output divides the input signal by a factor of 64, the $Q_3$ output thereof divides the input signal by a factor of 128 and the $Q_4$ output thereof divides the input signal by a factor of 256. As long as either the $Q_4$ output on the counter 116 or the $Q_1$ or $Q_2$ outputs on the counter 118 are a logic "high", the signal at the node 130 is a logic "high". In a similar manner, if either the $Q_3$ or the $Q_4$ output of the counter 118 is a logic "high", indicating that more than 128 input audio pulses have been received, the signal input to the negative input of the comparator 140 is a logic "high". This high signal causes the output of the comparator 140 to make a transition from a logic "high" state to a logic "low" state. Under normal conditions, the $Q_3$ and $Q_4$ outputs of the counter 118 are low, resulting in a logic "high" state on the output of the comparator 140.

An up counter 148 has the enable input at pin 10 connected to the $\overline{Q}$ output of the flip-flop 110 to receive the 1 Hz synchronized timing signal. The clock at pin 9 of counter 148 is connected to the carry-out terminal at pin 7 of the counter 118. The reset pulse at the output of the inverter 122 is connected to the reset input at pin 15 of the counter 148. The $Q_2$ output at pin 12 of counter 148 is connected to the cathode of a diode 150 and the $Q_4$ output at pin 14 is connected to the cathode of a diode 152. The $Q_2$ output at pin 12 divides the audio depth signal by a factor of 1024 and the $Q_4$ output on pin 14 divides the audio depth signal by a factor of 4096. The anodes of the diodes 150 and 152 are connected to the D-input at pin 5 of a D-type flip-flop 154. A resistor 156 is connected between the D-input of flip-flop 154 and $V_{CC}$.

When the $Q_2$ and $Q_4$ outputs of the counter 148 are low, which occurs when the audio depth signal has less than 4096 pulses during one-half of the 1 Hz synchronized timing pulse, both the $Q_2$ and $Q_4$ outputs are in a "low" logic state, resulting in conduction by the diodes 150 and 152. This conduction brings the D-input of the flip-flop 154 to a logic "low" state. When the frequency of the audio signal is such that the counter 148 counts 4096 pulses during the one-half cycle of the timing pulses pin 10, the diodes 150 and 152 have their respective cathodes at a logic "high" state, thereby raising the level of the signal on the D-input of the flip-flop 154 from a logic "low" state to a logic "high" state. The resistor 156 is a pull-up resistor which provides current for diodes 150 and 152. The function of the counter 148 is to indicate that the audio depth signal has more than 4096 pulses during the period of the timing signal prior to a reset pulse being generated by the flip-flop 110. When this occurs, the frequency of the audio depth signal is greater than 5120 Hz, thus indicating that a pressure greater than 150 feet has been reached. The counter 148 and a flip-flop 110 are included in the maximum depth circuit 32.

The flip-flop 154 has the clock input at pin 3 connected to the $\overline{Q}$ output of the flip-flop 110 to receive the 1 Hz synchronized timing signal. The $\overline{Q}$ output at pin 2 of flip-flop 154 is connected to the anode of a diode 158. During the positive going transition of the timing signal on the clock input of the flip-flop 154, the logic signal on the data input thereof is transferred to the output and inverted. The normal condition at the data input at pin 5 of flip-flop 154 is a logic "low" state and this state is initially transferred as a logic "high" state to the $\overline{Q}$ output. When the frequency of the audio depth signal exceeds 5120 Hz, the signal on the data input to the flip-flop 154 makes a transition from a logic "low" to a logic "high" state. A "high" logic state is produced at the $\overline{Q}$ output of flip-flop 154 when the 1 Hz synchronized timing signal makes a transition from a "low" to a "high". This is the alarm signal to indicate that a maximum depth limit has been reached.

A D-type flip-flop 160 has the data input at pin 9 connected to the output of the comparator 140. The clock input of flip-flop 160 is connected to the $\overline{Q}$ output of the flip-flop 110 to receive the 1 Hz synchronized timing signal. Pins 4, 6, 7, 8 and 10 of flip-flop 160 are connected to ground. It should be understood that the flip-flop 154 and the flip-flop 160 are a dual-D type flip-flops, having common pins. As described above, under normal conditions where the ascent or descent rate is less than 30 Hz/ft., the data input to the flip-flop 160 is a logic "low", resulting in a logic "high" state on the $\overline{Q}$ output at pin 12. This logic state is clocked to the $\overline{Q}$ output when the 1 Hz synchronized timing signal makes a transition from a logic "low" state to a logic "high" state.

An inverter 161 has its output connected to a node 162. The input of inverter 161 is connected to a node 164. A diode 166 has its anode connected to node 162 and its cathode connected to node 164. A resistor 168 is connected in parallel with diode 166. A capacitor 170 is connected between node 164 and ground. A resistor 172 is connected between node 164 and the anode of a diode 174. The cathode of diode 174 is connected to the $\overline{Q}$ output of flip-flop 160. A capacitor 176 is connected between node 162 and a node 178. The inverter 161 and the associated components connected to the nodes 162 and 164 form an oscillator. The signal on the cathode of the diode 174 is operable to vary a period of the oscillator from ten seconds to two seconds. For example, the signal under normal conditions on the cathode of the diode 174 is a logic "high", resulting in no conduction through the diode 174. When the cathode of the diode 174 is placed at a logic "low" state, the diode 174 conducts and the resistor 172 is essentially placed in parallel with the capacitor 170. This in effect reduces the period of the oscillator from ten seconds to two seconds.

An inverter 180 has its input connected to node 178 and its output connected to the cathode of a diode 182. A resistor 184 is connected between node 178 and $V_{CC}$. The inverter 180, in conjunction with the resistor 184 and the capacitor 176, provides a one second pulse output whenever a transition occurs at node 178. Therefore, the inverter 180 provides a one second pulse which is synchronized with the period of the signal at node 162.

A resistor 185 is connected between $V_{CC}$ and $V_{REF}$. A zener diode 186 has the cathode thereof connected to $V_{REF}$ and the anode thereof connected to ground. The zener diode 186 provides the $V_{REF}$ supply voltage at approximately 3.0 volts.

A comparator 188 has a negative input thereof connected to $V_{REF}$ and the positive input thereof connected to a node 190. A resistor 191 is connected between node 190 and $V_{CC}$. A capacitor 192 is connected between node 190 and ground. A resistor 194 is connected between the node 190 and ground. A resistor 196 is connected between node 190 and the output of comparator 188. The output comparator 188 is connected to node 178. The comparator 188 and the associated components provide a battery test circuit and a battery status circuit for the battery monitor circuit 40 shown in FIG. 1. When the system is initially turned on, the voltage at the positive input of the comparator 188 is low until the capacitor 192 can charge up through the resistor 191. This results in the positive input of the comparator 188 starting with a voltage level that is below $V_{REF}$ at the negative input comparator 188. The output of comparator 188 is therefore a logic "low" state resulting in activation of the inverter 180 to be continuous rather than pulse operation. This is useful in determining that the system is turned on.

The $V_{CC}$ level is divided between the resistor 191 and the resistor 194 and when the voltage at the $V_{CC}$ terminal decreases below a desired level, the comparator 188 again goes from a logic "high" state to a logic "low" state, resulting in activation of the inverter 180 in a continuous manner. The comparator 188 therefore provides both an initial turn-on test for the battery and an indication of low voltage at the $V_{CC}$ terminal as when the battery 41 is drained of its power reserves.

The anode of diode 182 is connected to a node 198. A diode 200 has its anode connected to the node 198 and its cathode connected to the cathode of diode 158. A resistor 202 is connected between the connected cathodes of diodes 158 and 200 and the $Q_{12}$ output at pin 1 of the counter 106. A resistor 204 is connected between node 198 and the output of the divide-by-2 counter 104.

An inverter 206 has its input connected to node 198 and its output connected to a first terminal of a piezoelectric disk 208, which comprise the audio disk 38 of FIG. 1. An inverter 210 receives the output of inverter 206 and provides its output to the other terminal of piezoelectric disk 208. The inverters 206 and 210 and the piezoelectric disk 208 are connected in a bridge configuration to drive the piezoelectric disk 208. The piezoelectric disk 208 produces an audible signal for the diver.

When the output of the inverter 180 is a logic "high", the diode 182 does not conduct. This allows the signal output from the divide-by-2 circuit 104, which is the audio depth signal, to pass through the resistor 204 to the input of the inverter 206. As long as the diode 200 does not conduct, that is, the logic state at the cathode thereof is "high", the audio signal passes to the piezoelectric disk 208. This state occurs for only one second out of the time period produced by the oscillator comprising the inverter 161 and its associated components. Therefore, the audio depth signal produced by the divide-by-2 circuit 104 is periodically input to the piezoelectric disk 208. The purpose of this periodicity is to provide the diver with an intermittent audio tone which has a frequency corresponding to a given depth. It is not necessary that the diver receive a continuous tone, but only a periodic tone. In addition, the low duty cycle of the periodic tone increases the life of the battery 41.

When the rate of ascent or the rate of descent has been exceeded and the logic state at the $\overline{Q}$ output of the flip-flop 160 is changed, the period for the signal on the node 162 changes from ten seconds to two seconds since the resistor 172 is now paralleled with the capacitor 170, as described above. This change in periodicity is sufficient to allow the diver to distinguish that the one second pulse of audio tone is now occurring once every two seconds rather than the normal period of once every ten seconds.

When a maximum depth has been exceeded, the logic state at the output of the flip-flop 154 is altered. As described above, the $\overline{Q}$ output thereof makes a transition from a logic "high" state to a logic "low" state. This effectively removes a positive voltage from the anode of the diode 158. Under normal conditions, with the anode of the diode 158 at a logic "high" state, the cathode thereof is also maintained at a logic "high" state. Therefore, the "high" level at pin 1 of the counter 106, which produces an 8 Hz signal, has no effect on the signal level at the node 198. However, when the anode of the diode 158 is reduced to a logic "low" state, the diode 200 begins to conduct when the signal on the $Q_{12}$ output on the counter 106 goes to a logic "low" state. The effect of this is that during the one second pulse that occurs every ten seconds, the audio tone is further modulated with an 8 Hz signal. This 8 Hz modulation is distinguishable to the diver and as such, the diver can recognize that he has exceeded the predetermined depth.

Figure 3A:
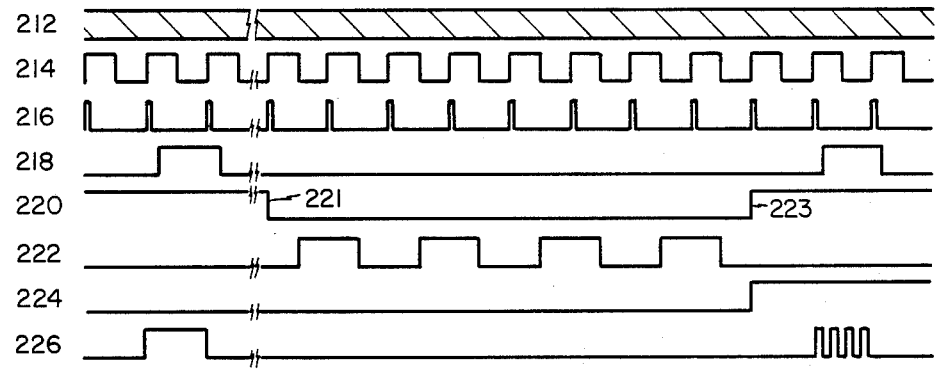
FIG. 3a is an illustration of pulse waveforms for the circuitry shown in FIG. 2.

Referring now to FIG. 3a, there are shown signal waveforms for the circuit in FIG. 2. The audio depth signal produced by circuit 104 has a frequency range between 500 Hz and 5,000 Hz and is illustrated as a pulse train 212. The pulse train 212 is shown shaded because of its relatively high frequency as compared to the other signals in FIG. 3a. The 1 Hz synchronized timing signal produced at the $\overline{Q}$ output of the flip-flop 110 is shown as a pulse waveform 214. The string of reset pulses that are produced by the inverter 122 are shown as a pulse waveform 216. The reset pulses in the waveform 216 are lined up in time with the positive transitions in the waveform 214. The pulse waveform 214 drives the counters 116 and 118 to be in the up counting mode when the waveform is at the logic "high" state and drives the counters to be in the down-count mode when the waveform is in the logic "low" state. The reset pulses in the waveform 216 are operable to reset the counters to zero prior to beginning the up-count mode.

A waveform 218 illustrates the output of the inverter 180 which provides the one second pulse that periodically occurs over the ten second interval produced by the inverter 180. A waveform 220 illustrates the output of flip-flop 160 for the condition wherein flip-flop 160 is activated to provide an alarm output indicating that the rate of ascent or descent is too great. When the rate of ascent or descent is too great, the data input on pin 9 of the flip-flop 160 changes states from a logic "low" to a logic "high". When the 1 Hz synchronized timing signal output by the flip-flop 110 at pin 13 thereof makes a positive transition represented by the waveform 214, the $\overline{Q}$ output of the flip-flop 160 changes logic states from a "high" to a "low" as represented by a transition 221 in the waveform 220. When the waveform 220 is in the "low" state, the resistor 172 is paralleled with the capacitor 170, thus changing the period of the signal at node 162 from ten seconds to two seconds. This in turn affects the occurrence of the one second pulse that is output by the inverter 180. The waveform at node 198, under the condition that the $\overline{Q}$ output of the flip-flop 160 is in the "low" state, is represented by a waveform 222. The waveform 222 illustrates that the audio tone of the pulse train 212 is gated on for a one second duration every two seconds. When the ascent rate is decreased below the predetermined level, the data input to the flip-flop 160 makes a transition back to a "low" state and the $\overline{Q}$ output thereof is set accordingly on the next occurring positive transition of the waveform 214 to a "high" state as represented by a positive transition 223 in waveform 220. This returns the operation of the gating pulse to the waveform 218, that is, to a one second pulse occurring every ten seconds. It should be understood that the waveforms 218 and 222 represent the signal on the node 198, and are shown separately for simplicity.

A waveform 224 illustrates the condition in which the maximum depth has been surpassed and the $\overline{Q}$ output of the flip-flop 154 makes a transition from a "high" state to a "low" state. As described above, when this occurs, the $Q_{12}$ output of the counter 106 is operable to modulate the audio signal during the one second gating pulse that the audio signal is turned on. This is illustrated by the gated pulse in a waveform 226 that is coincident with the logic "high" state of the waveform 224. The waveform 226 occurs at the node 198 and is similar to the waveforms 218 and 222.

Figure 3B:
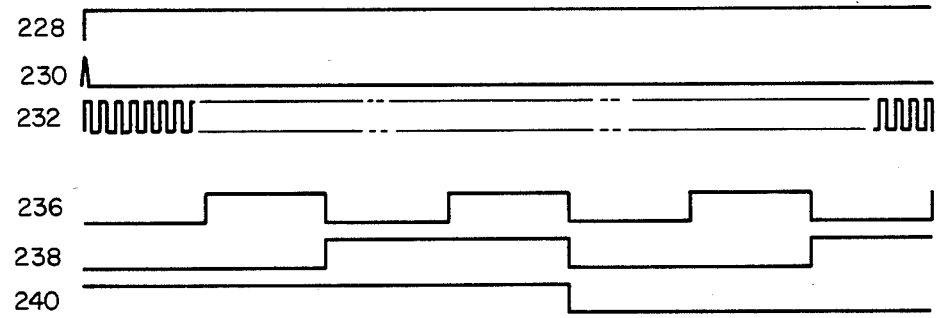
FIG. 3b is an illustration of pulse waveforms for the up/down counter circuitry shown in FIG. 2.

Referring now to FIG. 3b, there are illustrated the waveforms for the operation of the counters 116 and 118. A waveform 228 illustrates the 1 Hz synchronized timing signal output by the flip-flop 110 at pin 13 thereof expanded over that illustrated in the waveform 214. A waveform 230 illustrates the reset pulse expanded over the waveform 216 illustrated in FIG. 3a. A waveform 232 illustrates the audio depth signal expanded over that illustrated in the pulse train 212.

A pulse waveform 236 illustrates the $Q_4$ output of the counter 116. A pulse waveform 238 illustrates the $Q_2$ output of the counter 118 and a waveform 240 illustrates the $Q_2$ output of counter 118. It can be seen that the diodes 128, 132 and 134, as shown in FIG. 2, are operable to provide an OR function for the three waveforms 236-240. The output of these diodes drives the signal on the node 130 "high" after five pulses have been received from the output of the divide-by-2 circuit 104. Although not illustrated, the counters 116 and 118 continue to count up for one-half second and then the count mode changes, as illustrated by the waveform 214, and both counters are put into the down-count mode. The combined counters then begin to count down and, if the frequency has not been changed, the three waveforms 236-240 should return to their initial starting position when the reset pulse of the waveform 230 occurs. However, if there has been an ascent, that is, a decrease in pressure, the frequency decreases, resulting in a fewer number of pulses occurring during the countdown operation. If the number of pulses counted up is greater than the number of pulses counted down by at least five, the logic state on the node 130 is "high" since one of the output terminals of the waveforms 236-240 is in a "high" state. At the positive transition of the 1 Hz synchronized timing control signal from the flip-flop 110, this data is clocked to the output thereof to activate the alarm until another duty cycle of the 1 Hz synchronized timing signal has occurred. For example, a 1,000 Hz tone results in 500 pulses stored in a counter for the one-half second count-up mode and, if there has been no change in frequency, the counters 116 and 118 count down 500 pulses, resulting in logic "low" states on the outputs of the counters 116 and 118. If, however, there has been a decrease in depth of approximately one foot within the one second duration of the 1 Hz synchronized timing signal, then the number of pulses counted up will be approximately 7.5 pulses less than 500 or 492.5 and the count-down operation will also result in an additional deficiency of 7.5 pulses which results in a logic "high" state on the $Q_4$ output of the counter 116 as depicted in the waveform 236.

For a descent condition or an increasing depth, the frequency is increasing during the duration of the count-up and count-down mode. This results in an excess number of pulses counted. The result is that the counter returns to a zero count mode and then begins counting backwards, prior to the occurrence of a reset pulse. Since the maximum count for the counter is 256, the counters begin to count down from 256. This results in one of the outputs $Q_3$ or $Q_4$ of counter 118 having a logic "high" state thereon, which in turn results in the output of the comparator 140 changing states from a "high" to a "low". It should be understood that the comparator 140 is of the type that has an open collector output such that there is no output unless both the logic state on the node 130 is "high" and the logic state on the output of the comparator 140 is also "high". The result is that for a descending dive, the $\overline{Q}$ output of the flip-flop 160 will go to a "low" state.

In addition to recognizing that the audible tone has a changing modulation due to the presence of a change in depth or exceeding a maximum depth, the diver also is aware of the relative frequency corresponding to his depth. This allows the diver to simultaneously detect his relative depth and whether he is ascending or descending as compared to his relative depth. This is important in certain situations such as cave diving where the diver has few bearings available to indicate what direction is, up or down. Even in the situation where the diver is below his maximum depth, it is possible that he can be aware of the relative depth, the direction that he is proceeding in, whether he is proceeding at too quick a rate of ascent or descent and the fact that he has exceeded his maximum depth. This information is simultaneously available to the diver through audible means with the present invention.

Figure 4:
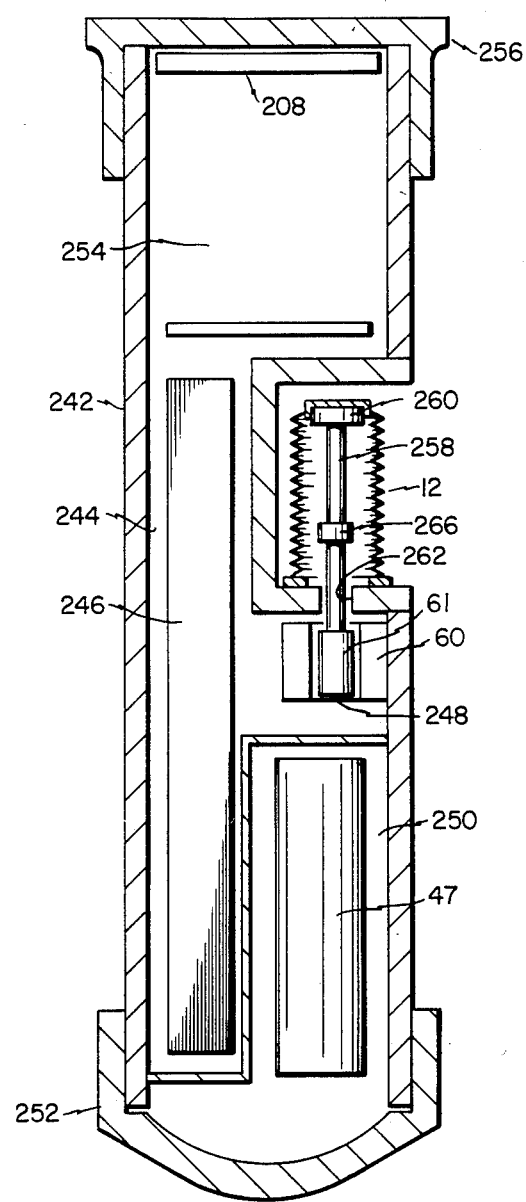
FIG. 4 is a cross-sectional view of a complete apparatus including the present invention.

Referring now to FIG. 4, there is shown a cross-sectional diagram of an assembled electronic diving apparatus of the present invention. A cylindrical housing 242 has an electronics compartment 244 that houses an electronics package 246 comprising the circuitry illustrated in FIG. 2. There is also included a coil housing 248 that houses the inductor 60 shown in FIG. 2. A battery compartment 250 houses the battery 47 and an end cap 252 fits over the end of the cylindrical housing to protect the battery compartment 250 from the external environment. A tuned cavity 254 is disposed at the opposite end of the cylindrical housing 242 from the cap 252. The piezoelectric disk 208 is disposed at the extreme outer end of the cavity 254. The tuned cavity 254 is utilized to give the desired acoustical properties to the piezoelectric disk 208. An end cap 256 is disposed over the piezoelectric disk 208 to protect the disk from the external environment.

The mechanical bellows 12 is disposed adjacent to the coil housing 248. The mechanical bellows 12 has a rod 258 that is disposed in the interior thereof and is attached to one extreme surface of the bellows 12 by a nut 260. The rod 258 extends through the housing 242 through a hole 262. On the end of the rod 258, opposite the nut 260, is disposed the ferrite tuning core 61 which is inserted in the center of the inductor 60. A stop 266 is disposed on the rod 258 to limit the travel thereof. The mechanical bellows 12 is manufactured as an accordian-like metal sheath that is movable in a lateral direction parallel to the longitudinal axis of the rod 258. The internal pressure of the bellows is equilibriated with the internal pressure of the housing 242 which is sealed from the external environment. Therefore, a change in the external pressure causes a movement in the bellows 12. The end cap 252 allows the battery 47 to be removed without disturbing the internal environment of the cylindrical housing 242.

A further embodiment of the present invention is illustrated as a functional block diagram in FIG. 5. The apparatus shown in FIG. 5 utilizes two additional functional blocks of circuitry which are connected to the previously described circuitry shown in FIGS. 1 and 2. The objective of the embodiment shown in FIG. 5 is to preset a depth and then indicate to the diver when he has reached the preset depth. When the diver reaches the preset depth there is a change in the duty cycle of the audio tone provided to the diver. The change in duty cycle indicates to the diver that he is within a certain distance of his preset depth.

Further referring to FIG. 5 there is included a magnetic coupling 280 which communicates a predetermined depth setting from outside the housing 242, shown in FIG. 4, to a preset depth data circuit 282 within the housing 242. The external depth setting is shown by the schematic depth gauge 284. The selected depth is stored in binary form within the circuit 282.

The binary depth setting from circuit 282 is transmitted through lines 286 to a digital comparator/latch 288. A depth count is produced by the up/down counters 30 and transmitted through a line 290 to the latch 288. Upon detection of an equality between the preselected depth data transmitted through lines 286 and the actual depth count transmitted through lines 290, there is produced an equality output signal at a line 292. This signal is transmitted to the audio driver and output circuit 28 to produce a high duty cycle tone to the diver to indicate that the preselected depth has been reached.

The time base and synchronizer 24 provides timing signals to lines 294 and 296 respectively to the latch 288 and the counters 30.

Two methods are suggested for increasing the duty cycle of the tone provided to the diver. In a first method, two of the one second tones described above, in each ten second period, can be generated to indicate that the preset depth has been reached. In a second method, a unique duty cycle change is used to indicate that the preset depth has been reached. This change in duty cycle can be from, for example, 75% on, 25% off to 25% on, 75% off. The rate of ascent alarm operates in the same manner as described above.

A further feature of the present invention is illustrated in FIGS. 6 and 7. A block diagram of this feature with circuit elements interconnected to the functional blocks illustrated in FIG. 1 is shown in FIG. 6. The purpose of the apparatus shown in FIG. 6 is to provide the diver with a numeric representation of his depth. The divers current depth, as represented by the count of the up counter within counters 30, is latched through lines 300 to a depth register 302. The sequencing of a latch operation is controlled by the time base and synchronizer 24. The depth value in register 302 is transmitted to a decoder 304 which produces a digital representation of depth with 10-foot resolution. The decoded depth signal is then transmitted from decoder 304 to a sequencer 306 which generates a series of tones to indicate the depth value. The sequencer 306 produces two different tones in a particular sequence which can be readily interpreted by the diver to indicate his depth. The output from the sequencer 306 is provided to the audio driver and output circuit 28 which drives the audio disk 38.

An illustration of the tone sequence is shown in FIG. 7. The two different frequency tones produced by sequencer 306 are represented by a + and a −. Each depth in 10-foot increments corresponds to a particular sequence of the two tones. Each + tone corresponds to a 10-foot depth and each − tone corresponds to a 50-foot depth. Thus, for example, a depth of 80-feet is indicated by − tone followed by three + tones. This sequence provides a 10-foot resolution with a maximum of six tones in a sequence. If a third frequency tone is utilized, then this same number of tones in a sequence could be used to produce a 5-foot resolution. Again, the ascent rate alarm operates in the same manner described above with the exception of having only a one tone frequency.

A further aspect of the present invention is illustrated in FIG. 8. This aspect is similar to that shown in FIG. 6 with the exception that a synthesized voice signal is produced in place of the tones described above. The up-count from the counters 30 is transmitted through lines 310 to the depth register 302. The depth value stored in the register 302 is transmitted through lines 312 to a speech synthesis integrated circuit 314. The timing of operation for the circuit 314 is controlled with the time base and synchronizer 24. The circuit 314 produces a selected synthesized voice statement announcing each depth through the audio disk 38. A special speech message is used for the ascent rate and excessive depth alarm conditions as well. A representative speech synthesis integrated circuit for use in this embodiment is a model TMS 5100 manufactured by Texas Instruments.

Figure 9:
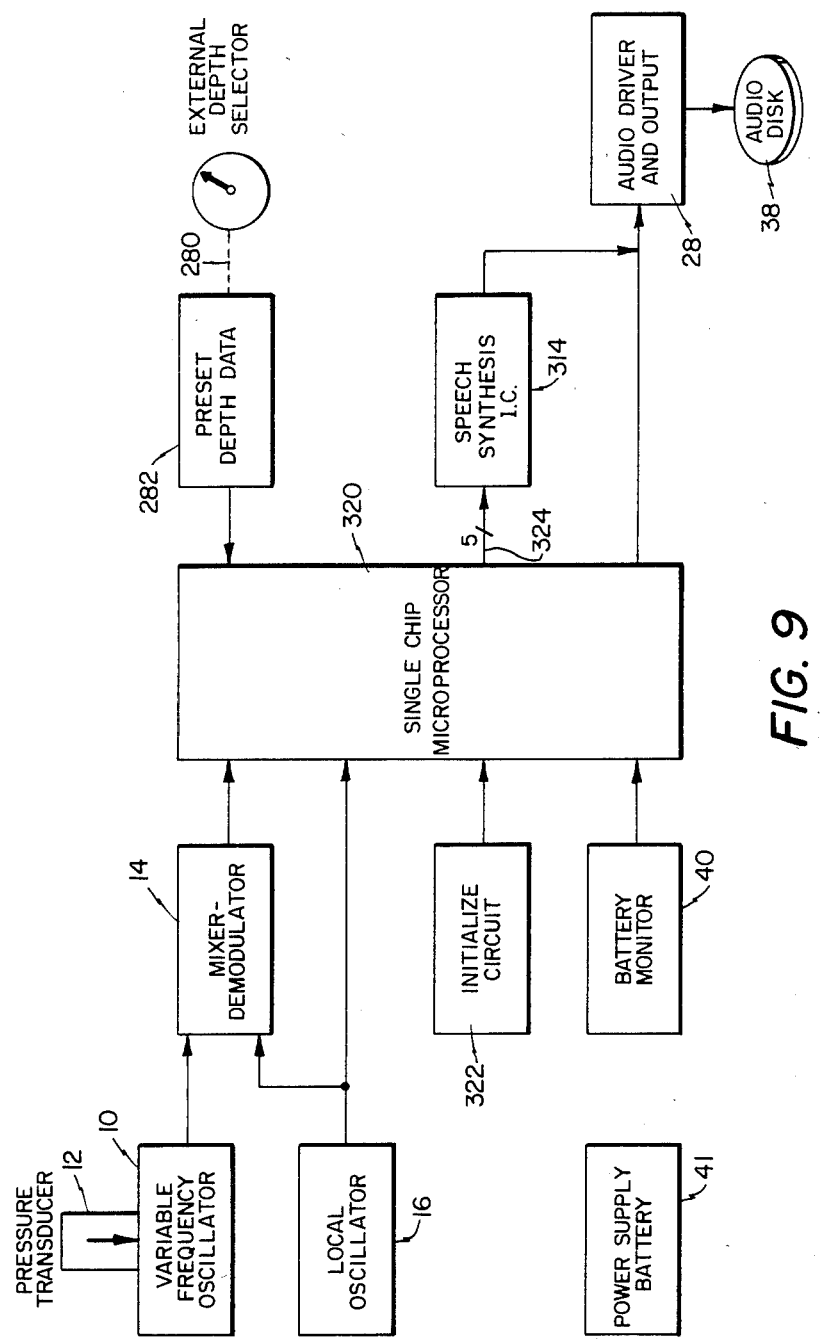
FIG. 9 is a functional block diagram of an embodiment of the present invention which employs a microprocessor to replace portions of circuitry shown in FIG. 2.

A still further embodiment of the present invention is illustrated in FIG. 9. In this embodiment, a substantial portion of the discrete logic and circuit devices shown in FIGS. 1 and 2 are replaced through the operation of a single chip microprocessor 320. A preferred microprocessor for this application is a model TMS 1000 manufactured by Texas Instruments. The microprocessor 320 is set up for operation by an initialize circuit 322.

The embodiment shown in FIG. 9 can optionally include each of the features described above in reference to FIGS. 1, 5, 6 and 8. The VFO 10, mixer-demodulator 14 and local oscillator 16 operate as described above but feed the resulting outputs directly to the microprocessor 320 where they are digitized for operation within the circuit. The battery monitor 40 likewise provides a battery status indication to the microprocessor 320. The preset depth data 282 operates as described previously to provide a preset depth signal to the microprocessor 320.

The microprocessor 320 produces outputs as described above and transmits these outputs to the audio driver and output circuit 28 which in turn drives the audio disk 38 to produce the sounds described in reference to the above figures. The microprocessor 320 further produces digital outputs which are transmitted through a line 324 to a speech synthesizer integrated circuit 314. This circuit produces the voice messages described above in reference to FIG. 8 and these messages are in turn passed through the audio driver and output circuit 28 and audio disk 38.

The embodiment of the present invention illustrated in FIG. 9 can utilize a substantially fewer number of components and can be packaged in a smaller housing than if discrete components are utilized as shown in reference to FIG. 2.

In summary, there has been disclosed a device for providing to a diver audible status information as to the relative depth of his dive, his direction of vertical movement in the water, an alarm for indicating if he is ascending or descending at too rapid a rate and an alarm to indicate that he has exceeded a maximum depth. This information is transmitted to the diver via an audible signal that varies in frequency to indicate to the diver his relative depth. In addition, the increasing or decreasing of the frequency indicates to the diver his direction of vertical movement. The alarm modes to indicate both too rapid a descent or ascent and too great a depth are transmitted to the diver simultaneously with the information regarding relative depth and vertical direction. In further embodiments, digital signals are produced to indicate depth and synthesized speech can be produced to communicate status conditions to the diver. This provides a diver with non-distracting status signals which do not require his constant attention nor do they require the use of his eyes or his extremities to retrieve the information.

Part numbers for the circuit of FIG. 1 are shown below in Table 1 for an exemplary embodiment of the present invention.

TABLE 1

| Reference Numeral | Generic Number | Manufacturer |
|---|---|---|
| 42, 62, 66, 114, 122 161, 180, 206 | CD 4007 | |
| 210 | MC 14584 | Motorola Semiconductors |
| 94, 140, 188 | LM 339 | National Semiconductors |
| 104, 148 | CD 4520 | RCA Inc. |
| 106 | CD 4020 | RCA Inc. |
| 108, 110, 160, 154 | CD 4013 | RCA Inc. |
| 116, 118 | CD 4029 | RCA Inc. |

Although the preferred embodiment of the invention has been described in detail, it should be understood that various changes, substitutions and alterations can be made therein without departing from the spirit and scope of the invention as defined by the appended claims.

I claim:

1. An electronic diving apparatus for producing indication sounds to assist a diver carrying the apparatus, comprising:
    means for sensing ambient pressure in a body of water;
    means responsive to said means for sensing for generating a depth signal having a frequency related to said ambient pressure;
    timing means for gating said depth signal to produce periodic audio signal pulses separated by intervals of silence having a greater time duration than said pulses; and
    transducer means for receiving said gated depth signal and producing a corresponding sound in said body of water for indicating the depth of said apparatus within said body of water.

2. An electronic diving apparatus as recited in claim 1 wherein said transducer means comprises a speech synthesizer which verbally indicates the depth of said apparatus within said body of water.

3. An electronic diving apparatus for producing indication sounds to assist a diver carrying the apparatus, comprising:
    means for sensing ambient pressure in a body of water;
    means responsive to said means for sensing for generating a depth signal having a frequency proportional to said ambient pressure;
    means for storing a maximum depth count corresponding to a selected maximum depth in said water input to said apparatus by said diver;
    means for converting said depth signal into a series of corresponding pulses;
    means for counting said pulses during a predetermined time to produce an acutal depth count;
    means for comparing said actual depth count with said maximum depth count and producing an output signal upon detection of a comparison; and
    transducer means responsive to said output signal for producing a sound in said body of water to indicate to said diver that said apparatus is at said selected maximum depth in said body of water.

4. An electronic diving apparatus as recited in claim 3 wherein said transducer means comprises a speech synthesizer for producing a verbal report to indicate to said diver that said apparatus is at said selected maximum depth in said body of water.

5. An electronic diving apparatus for producing indication sounds for advising a diver, comprising:
   means for sensing ambient pressure in a body of water;
   means responsive to said means for sensing for producing a depth signal proportional to the depth of said apparatus in said body of water;
   means responsive to said depth signal for producing a sequence of audio tone pulses derived from said depth signal for indicating the depth of the diving appartus, said sequence comprising a combination of one or more first and second tone pulses corresponding respectively to first and second units of depth; and
   transducer means responsive to said sequence of audio tone pulses for producing corresponding sounds in said body of water.

6. An electronic diving apparatus for producing indication sounds, comprising:
   means for sensing ambient pressure in a body of water;
   means responsive to said means for sensing for producing a depth signal having a frequency related to said pressure;
   an up/down counter connected to receive and count said depth signal;
   timing means for controlling said counter for periodically producing an up-count and an immediate following down-count of said depth signal to produce a difference count for each continuation of said up and down count;
   means for storing a maximum rate-of-ascent difference count;
   means for comparing each of said counter produced difference counts with said maximum rate-of-ascent difference count to produce an alarm signal when said counter produced difference count exceeds said maximum rate-of-ascent difference count; and
   transducer means responsive to said alarm signal for producing a sound in said body of water.

7. An electronic diving apparatus for producing indication sounds, comprising:
   means for sensing ambient pressure in a body of water;
   means responsive to said means for sensing for generating an audio depth signal having a frequency related to said ambient pressure;
   timing means for gating said audio depth signal to produce audio pulses having a selectable duty cycle, said timing means producing a first duty cycle for a first mode of operation and a second duty cycle for a second mode of operation;
   means for storing a predetermined pressure parameter;
   means for setting said timing means in said first mode when said pressure related audio depth signal does not correspond to said pressure parameter and for setting said timing means in said second mode when said pressure related audio depth signal corresponds to said predetermined pressure parameter; and
   transducer means for receiving said gated audio depth signal and producing a corresponding sound in said body of water wherein said sound has said second duty cycle when said apparatus is at a depth corresponding to said predetermined pressure parameter.

8. An electronic diving apparatus for producing indication sounds, comprising:
   a pressure sensor;
   a variable frequency oscillator connected to said pressure sensor for producing a variable frequency signal having a frequency related to the depth of said apparatus in a body of water;
   a local oscillator for producing a reference signal;
   means for mixing said variable frequency signal and said reference signal to produce an audio depth signal;
   an up/down counter connected to receive and count said audio depth signal;
   timing means for periodically cycling said counter through an up-count followed by an immediate down-count of said audio depth signal to produce a difference count;
   a maximum rate-of-depth change circuit for comparing a stored maximum difference count with the periodically produced difference count from said counter to generate an alarm signal upon detection of a comparison;
   audio output means for gating said audio signal therethrough at a first duty cycle in the absence of said alarm signal and at a second duty cycle upon generation of said alarm signal; and
   transducer means for receiving said gated audio signal and producing a corresponding sound in said body of water.

9. A method for generating indication sounds for an electronic diving apparatus carried by a diver, comprising the steps of:
   sensing ambient pressure in a body of water;
   generating a depth signal in response to the sensing of said ambient pressure, said depth signal having a variable frequency which is related to said ambient pressure;
   gating said depth signal to produce periodic audio signal pulses separated by intervals of silence having a greater time duration than said pulses; and
   generating a sound in said body of water in response to said gated depth signal for indicating the depth of said apparatus to said diver within said body of water.

10. A method for generating indication sounds for an electronic diving apparatus carried by a diver as recited in claim 9 wherein the step of generating a sound in said body of water comprises generating a verbal report by operation of a speech synthesizer for indicating the depth of said apparatus to said diver within said body of water.

11. A method for generating indication sounds by an electronic diving appartus to assist a diver carrying the appartus, comprising the steps of:
   sensing ambient pressure in a body of water;
   producing a depth signal which is variable and represents the depth of said apparatus in said body of water as measured by said step of sensing;
   generating a sequence of audio tone pulses derived from said depth signal for indicating the depth of the diving apparatus, said sequence comprising a combination of one or more first and second tone pulses having different frequencies, said tone pulses correpsonding respectively to first and second units of depth; and generating sounds in said body of water, said sounds corresponding to said audio tone pulses, said pulses indicating the depth of said apparatus within said body of water.

12. A method as recited in claim 11 wherein said sequence of audio tone pulses comprises a predetermined number of first and second frequency tones.

13. A method for generating indication sounds for an electronic diving apparatus to assist a diver carrying the apparatus, comprising:
sensing ambient pressure in a body of water;
producing a depth signal in response to said step of sensing, said depth signal frequency variable and representing the depth of said apparatus in said body of water;
storing a predetermined maximum depth count corresponding to a selected maximum depth in said body of water;
converting said depth signal into a series of corresponding pulses;
counting said pulses during a predetermined time to produce an actual depth count;
comparing said actual depth count and said maximum depth count to generate an output signal upon detection of a comparison; and
producing a sound in said body of water in response to the generation of said output signal wherein said sound indicates that said apparatus is at the depth corresponding to said predetermined depth parameter.

14. A method for generating indication sounds for an electronic diving apparatus as recited in claim 13 wherein said step for producing a sound in said body of water comprises producing a verbal report to said diver by operation of a speech synthesizer to indicate that said apparatus is at the depth corresponding to said predtermined depth parameter.

* * * * *

UNITED STATES PATENT AND TRADEMARK OFFICE
CERTIFICATE OF CORRECTION

PATENT NO. : 4,604,737
DATED : Aug. 5, 1986
INVENTOR(S) : Hoffman

It is certified that error appears in the above-identified patent and that said Letters Patent is hereby corrected as shown below:

Claim 5, line 14 (page 3 of Amendment file 12/5/85, old Claim 4, lines 15-16):
 after "first and second tone pulses", insert --having different frequencies, said tone pulses--

Signed and Sealed this

Twentieth Day of January, 1987

Attest:

DONALD J. QUIGG

Attesting Officer     Commissioner of Patents and Trademarks